United States Patent [19]
Aquarius

[11] 3,829,262
[45] Aug. 13, 1974

[54] APPARATUS FOR FORMING LOLLIPOPS

[76] Inventor: Conrardus Hubertus Aquarius,
Kanaalstraat 13 Weert, Weert,
Netherlands

[22] Filed: Oct. 24, 1972

[21] Appl. No.: 299,699

[30] Foreign Application Priority Data
Oct. 27, 1971 Netherlands.................... 7114779

[52] U.S. Cl. ............. 425/126 S, 425/517, 425/233
[51] Int. Cl. ............................................. A23g 7/00
[58] Field of Search............. 425/112, 126 R, 126 S, 425/109, 233

[56] References Cited
UNITED STATES PATENTS
1,689,879  10/1928  Krout................................. 425/126
1,692,559  11/1928  Miller................................. 425/126
1,958,380  5/1934   Bottger et al...................... 425/126
3,541,973  11/1970  Aquarius........................... 425/112 X

*Primary Examiner*—J. Spencer Overholser
*Assistant Examiner*—David S. Safran
*Attorney, Agent, or Firm*—Kurt Kelman

[57] ABSTRACT

The invention disclosed is an apparatus for forming lollipops which apparatus is substantially characterized in that means which serve lumps from a sugar string consist of a pressure roller which is freely rotatable in the plane of cavities of the moulding drum and which is mounted on a shaft which is parallel with the axis of the moulding drum, and in that the flat periphery of the roller, in cooperation with opposite longitudinal edges of the cavities, severs lumps which are pushed into the cavities.

3 Claims, 5 Drawing Figures

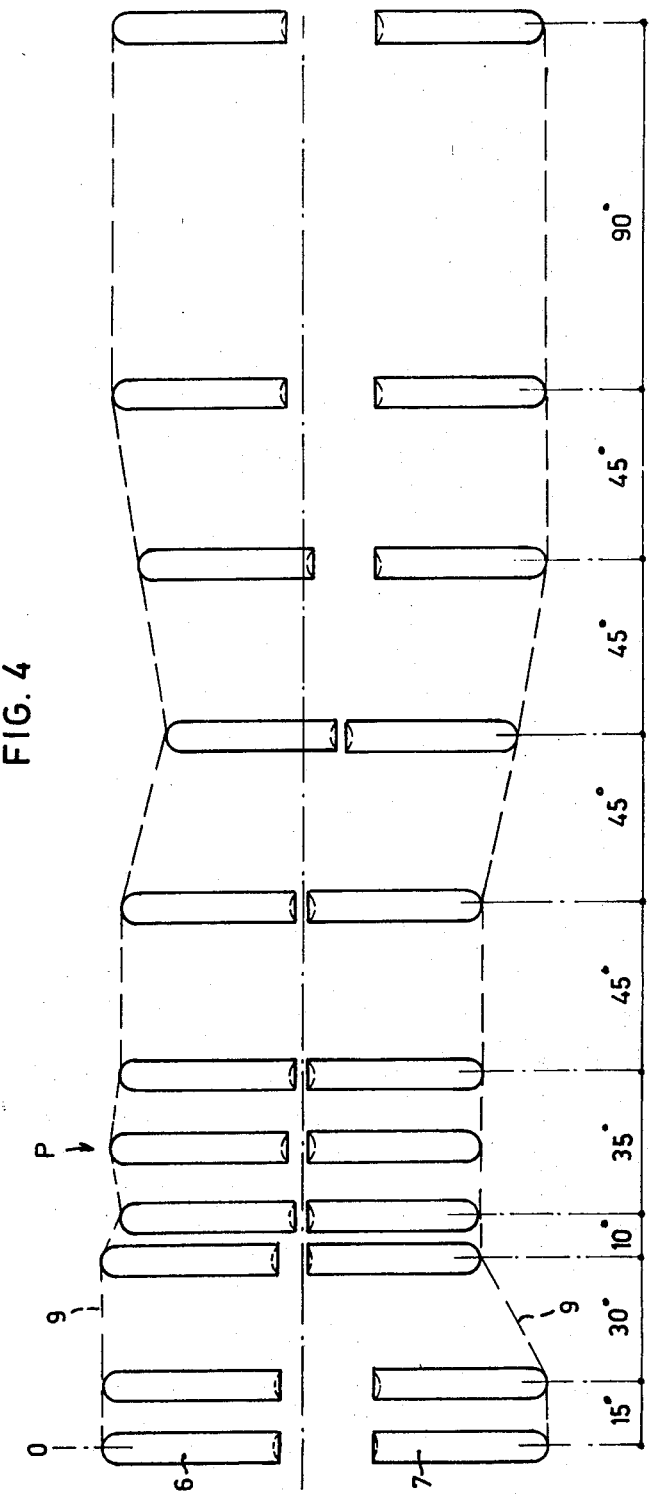

APPARATUS FOR FORMING LOLLIPOPS

The present invention relates to an apparatus for forming lollipops from a continuously supplied string of sugar, which apparatus, like an apparatus known from U.S. Pat. No. 1 958 380, includes:

a moulding drum rotatable around a horizontal central axis, comprising a series of cavities around its cylindrical peripheral outer surface, which cavities are uniformly distributed over said peripheral outer surface and each, between two moulding dies, define a moulding cavity for a lollipop, and wherein all moulding dies are peripherically located in two opposite series and, by the intermediary of guiding cams, are movable back and forth and parallel to the drum axis, in surrounding guides, and means located around the periphery of the moulding drum, which means, when the moulding dies are in retracted position, are allowed to sever successive lumps from the string of sugar and to push them into the cavities, which lumps are pressed then by the dies to give them their final shape, and a mechanism located at the periphery of the moulding drum, which mechanism, while the moulding drum is rotating, is allowed to insert the one end of the lollipop sticks, which are received from a supply device, e.g. a funnel, gradually and radially, e.i. perpendicularly to the relative direction of movement of the moulding dies in respect of the moulding drum, into the moulding cavities, and consequently, into the severed lumps which are present in the mould cavities.

In the apparatus according to said U.S. Pat. No. 1,958,380, the said means which sever lumps of the string, are adjacent pivoting flaps. In closed position each flap covers two adjacent halfs of two adjacent cavities. Consequently, the flaps form a wall portion of the cavities, in which cavities the lollipops are pressed. The pivoting flaps and their actuating means form a constructive complication which enlarges the chance of failures. Moreover the danger exists that when during pressing some play or clearance arises between the adjacent flaps, sugar material is pushed outwards through said play such that the lollipops have an uneven and unaesthetical longitudinal edge. The constructive complication is enlarged by the fact that the adjacent longitudinal edges of each two adjacent pivoting flaps have a half-circular insert opening for lollipop sticks. Since the lollipop sticks are inserted according to a straight radial path into the moulding cavities, and the flaps and, consequently, also the insert openings pass through an arc-shaped path when closing the flaps, failures in the operation often arise, mostly attendant with breakage of the sticks.

This last mentioned disadvantage is met by inserting the lollipop sticks in an axial direction, through a longitudinal bore in the moulding dies of one series. An apparatus according to this embodiment is represented in Netherlands Pat. 12874 which is the equivalent of U.S. Pat. No. 3 541 973 and British Pat. No. 145 480. Since, however, said known apparatus are also provided with pivoting flaps, the said objections, to wit constructive complications and the chance of play between adjacent flaps, are present. However, lollipop forming apparatus have been proposed which operate without pivoting flaps. Said apparatus comprise, however, two rotating moulding drums, each having cavities around their periphery. Each two opposite cavities of both drums form a lollipop and the sticks are inserted axially. The use of two moulding drums results in a very complicated and bulky apparatus.

It is an object of the present invention to improve an apparatus of the type according to U.S. Pat. No. 1 958 380 such that pivoting flaps are omitted. The apparatus according to the present invention is substantially characterized in that said means which serve lumps from the sugar string, consist of a pressure roller, which is freely rotatable in the plane of cavities of the moulding drum and is mounted on a shaft which is parallel with the axis of the moulding drum, and in that the flat periphery of the said roller, in co-operation with opposite longitudinal edges of the cavities, severs lumps and pushes these lumps into the cavities, and the guiding cams of the moulding dies have been carried out in such a way that, on the one side, the opposite end surface of each pair of moulding dies are spaced when they are in their pressing end position, said spacing not being smaller then the thickness of the lollipop sticks, and, on the other side, the severed lump, before being pressed, is moved laterally by the one moulding die, i.e. is moved axially in the cavity and out of the plane in which the pressure roller is mounted, such that the lump, when it is pressed, lies in a closed moulding cavity, which is laterally bounded by the opposite end surfaces of the two moulding dies and is peripherally bounded by the wall of the guide (8) of the other moulding die, which wall of the guide comprises a radial passage for the passage of the lollipop stick to be inserted.

In this embodiment the apparatus does not comprise pivoting flaps. The lumps are severed by the freely rotatable pressure roller. This results in an important constructive simplification of said apparatus. A further advantage results since the pressure roller rotates freely around its shaft and does not have a driving mechanism. The rotary movement of the pressure roller is realized by the frictional engagement of the roller and the sugar string. Since pivoting flaps are not provided, which flaps close the cavities during pressing the lumps in the apparatus according to U.S. Pat. No. Spec. 1 958 380, other provisions have been made for closing the moulding cavities during the pressing of the lumps in the apparatus according to the present invention. It follows from the above mentioned principal feature of the invention that said closure is realized by laterally moving said lump by means of the one moulding die such that it enters into the guide of the other moulding die. The inner wall of said guide then closes the periphery of the moulding cavity during the pressing action, quite apart from the said radial passage for the lollipop stick to be inserted. The described lateral movement of the lump to be pressed, consequently, is a direct consequence of the application of the pressure roller instead of pivoting flaps. At the place where the lumps are severed by the pressure roller, they cannot be pressed. The cavity would not be peripherally closed and when pressed the sugar material would escape from the cavity.

With reference to the drawing the above mentioned features, and other characterizing features of the apparatus according to the present invention are described.

FIG. 4 is a schematical view of the movements of a pair of moulding dies by means of guide cams.

Figure 1:
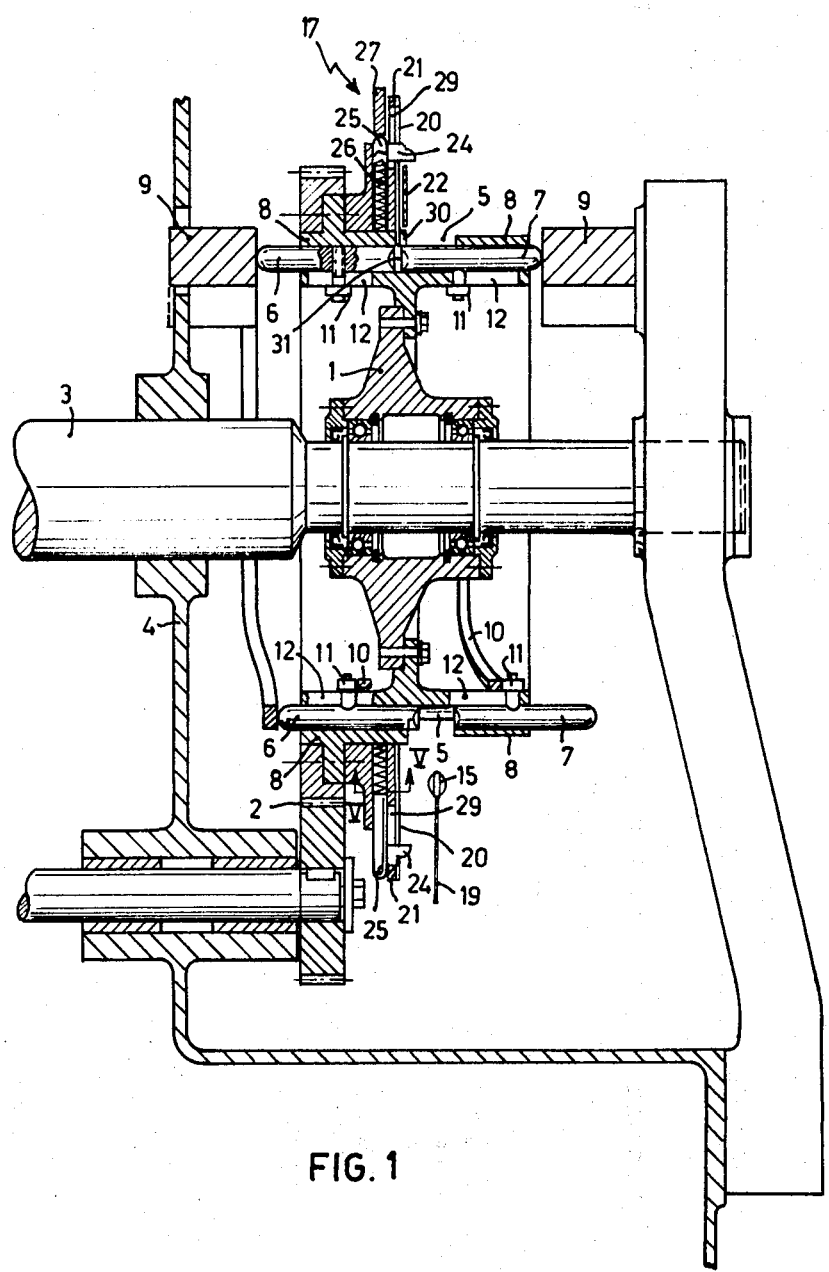
FIG. 1 is a cross section of the most important parts of the apparatus.
Figure 2:
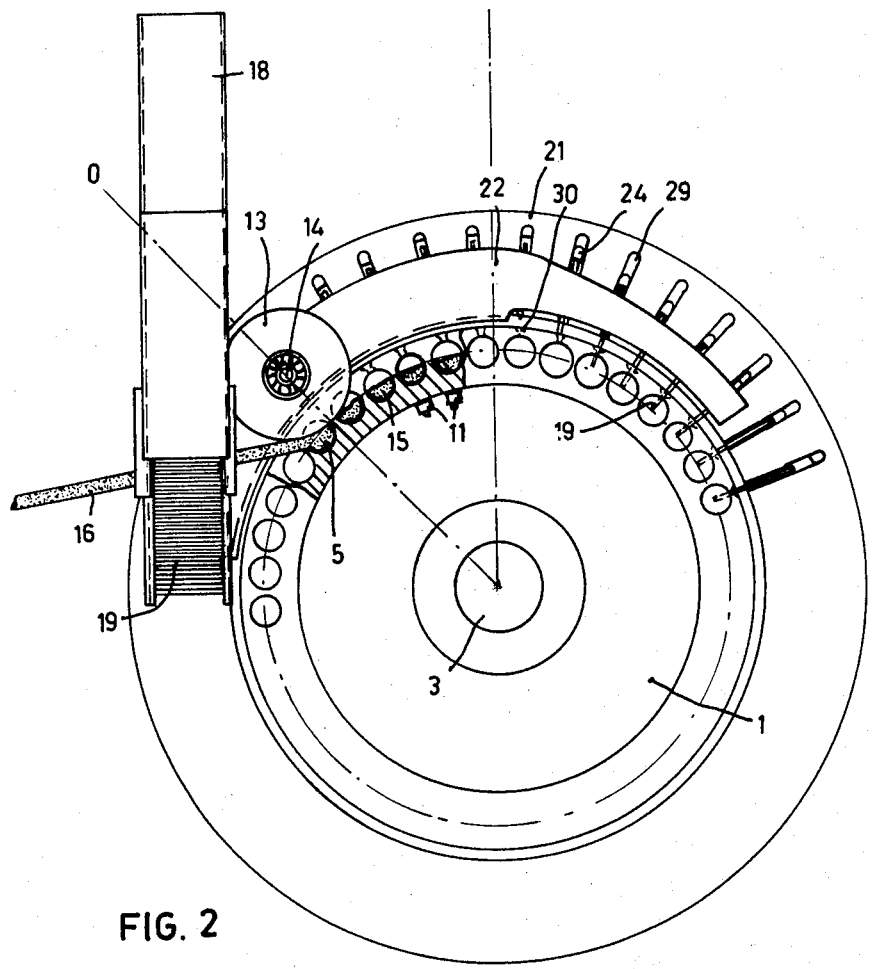
FIG. 2 is a front view of the apparatus, partially in cross section.
Figure 5:
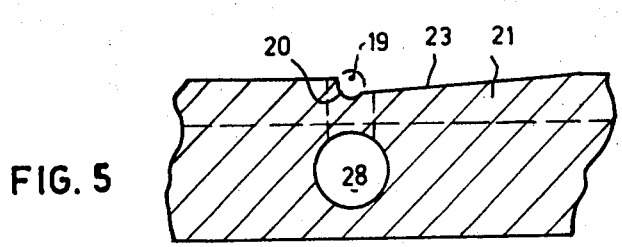
FIG. 5 is a cross section on the line V—V of FIG. 1.
Figure 3:
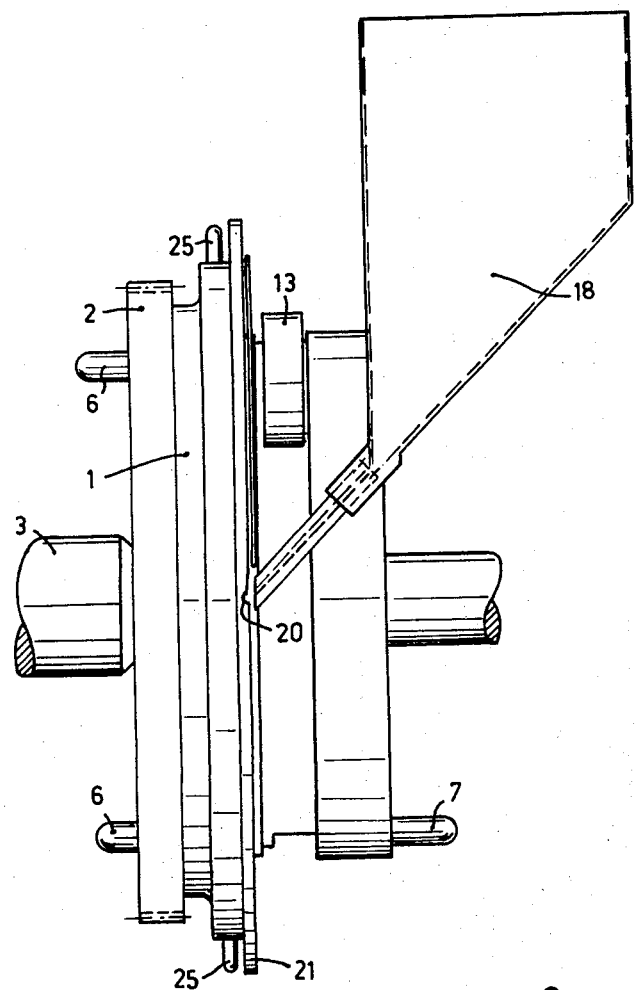
FIG. 3 is a side view of the apparatus.

The apparatus has a rotary moulding drum 1 which is driven by a driving gear 2. The moulding drum has its horizontal shaft 3 mounted in the frame 4. The cylindrical peripheral outer surface of the moulding drum comprises a series of recesses 5. These recesses are uniformly distributed over said peripheral outer surface. All moulding dies are peripherally located in two opposite series. They are movable back and forth in surrounding guides 8 and parallel to the drum shaft. Said back- and forth-movement is derived from stationary guiding cams 9 for the approaching movement of the moulding dies, and from stationary guiding cams 10 for the return movement of the moulding dies. The cams 9 engage the free ends of the moulding dies, and the cams 10 engage the rollers 11 on the dies. Longitudinal slots 12 in the guides 8 allow the slidable movement of the moulding dies. Next to the moulding drum, near its periphery, a pressure roller 13 is freely rotatable on a shaft 14 which is parallel to the drum shaft 3. The pressure roller 13 has a diameter which is substantially smaller than the diameter of the moulding drum. The flat periphery of the roller, in cooperation with opposite longitudinal edges of the cavities 5 severs lumps 15 from the continuous supplied sugar string 16 and pushes these lumps into the cavities 5 in order to have the severing action taken place without loss of sugar materials (scrap), the separating walls between the cavities 5 are made preferably as thin as possible, preferably tapering to the edge. The lumps are then completely severed and have not any thin connecting web between them.

At the periphery of the moulding drum a mechanism 17 has been mounted, which is allowed, when the moulding drum is rotating, to insert the one end of lollipop sticks 19 which are received from a supply funnel 18, gradually and radially into the closed moulding cavities and, consequently, into the lumps 5 present in those cavities.

The funnel 18 supplies the lollipop sticks 19, one by one, to radial channels 20 at the periphery of the rotary moulding drum. These channels are recessed in a plate 21 being stationarily connected with the drum. The number of channels 20 is equal to the number of cavities 5. To avoid lollipop sticks from falling out of the channels 19 when they are moved out of the funnel 18 to the insert mechanism 17 and when they have not yet been pushed sufficiently far into the lumps 15 a stationary retaining plate 22 is mounted perpendicularly to the drum shaft 3.

At each channel 20 the plate 21 is provided with a portion 23 which inclines downwards to the channel 20. By this feature, the lollipop stick 19 arrives quickly and in the right manner into the channel.

The lollipop sticks are radially pushed inwards by means of a pressure member 24 which engages the rear end of the sticks and projects from a pin 25 which is movable radially inwards against the action of the spring 26. This movement is effected by a stationary guide cam 27 which engages the rear ends of the pins 25. Each pin 25 is radially shiftable in a bore 28 of the plate 21. The pin and the pressure member 24 can make their required stroke by means of radial channel 29 in the plate 21. Through an insert opening 30 in the edge of the guide 18 of the moulding dies 16 each lollipop stick can enter into the cavity between the moulding dies 6 and 7, the so called moulding cavity 31, and consequently into the lump 15 which is present in said cavity.

In their retracted position the moulding dies 6 and 7 of each pair are in position 0 (FIG. 4). When in a cavity 5 the pressure roller 13 has severed a lump 15 from the string 16 the moulding die 7 moves said lump laterally to the left (in FIG. 1). The moulding die 6 remains stationary. This appears from the three first positions in FIG. 4, seen from the left. Then the lump is pressed which is effected by the fact that the moulding die 6 is pushed to the moulding die 7. This is the fourth position in FIG. 4. In said position the lump 15 is present in the closed moulding cavity 31, the periphery of which is closed by the wall of the guide 8 of the moulding die 6. From the fifth position in FIG. 4 (which position is indicated by arrow P) it appears that the moulding die 6 has been retracted over a short distance in respect to the moulding die 7. This has the follow reason. In the position P the insert mechanism 17 pushes a lollipop stick 19 through the insert opening 30 and into the closed moulding cavity 31, and consequently, into the lump 15. By retracting the moulding die 6 over a short distance, the pressure force on the lump 15 is slightly reduced and the lollipop stick meets with a less resistance when it is pushed into the lump. From the sixth position in FIG. 4 it appears that shortly after the insert of the lollipop stick the fourth position is restored again. Said pressure position is maintained for some time, and between the seventh and eighth position of the moulding dies a simultaneous slidable movement occurs, the moulding die 6 moving forwards and the moulding die 7 moving backwards. In this manner it is effected that the moulding die 7 returns gradually to its starting position. After the eight position in FIG. 4 also the moulding die 6 moves back until also this die is in its starting position. Accordingly as the spacing of the moulding dies 6 increases, the pressure on the pressed lollipop decreases, which lollipop falls out of the moulding drum (FIG. 1).

The graduation in FIG. 4 indicates for which part of one revolution the moulding dies occupy their various positions.

The present invention is not limited to the embodiments described and represented, but comprises all variants which are within the scope of the claimed rights. It is not strictly necessary that the oppositing end surfaces of the moulding dies have a more or less half-spherical cavity. They could have a cavity of a different shape, or could even be planar.

I claim:

1. An apparatus for forming lollipops from a continuously supplied string of sugar, which apparatus comprises in combination: a moulding drum rotatable around a horizontal central axis, a series of cavities disposed around the cylindrical peripheral outer surface of the drum, said cavities being uniformly distributed about the peripheral outer surface of the drum and each defining between two moulding dies a moulding cavity for a lollipop, said moulding dies being peripherally disposed in two opposite series and by means of guiding cams are movable back and forth and parallel to the drum axis, means located around the periphery of the moulding drum which when the moulding dies are in retracted position sever successive lumps from the string of sugar and push severed lumps into the cavities where the lumps are pressed by the dies to a final shape, and a mechanism located at the periphery of the moulding drum, which mechanism, while the moulding drum is rotating, inserts one end of a lollipip stick received from a supply, gradually and radially into a mould cavity and, consequently, into a severed lump in a mould cavity, the said means which sever lumps from the string of sugar having a pressure roller which is freely rotatable in the plane of the cavities of the moulding drum and is mounted on a shaft which is parallel with the axis of the moulding drum, a flat periphery of the said roller, in cooperation with opposite longitudinal edges of the cavities, provides means which sever lumps and push the severed lumps into the cavities, guiding cams for the moulding dies, said guiding cams disposed for placing end surfaces of each pair of moulding dies in spaced relation when they are in the pressing end position, said spacing not being smaller than the thickness of the lollipop sticks, severed lumps before being pressed are moved axially in the cavity and out of the plane in which the pressure roller is mounted such that each lump, when pressed, lies in a closed mould cavity which is laterally bound by opposite end surfaces of two moulding dies and is peripherally bound by a wall of the guide of the other moulding die, said wall of the guide comprising a radial passage for passage of the lollipop stick to be inserted.

2. The apparatus of claim 1 wherein guiding cams of the moulding dies, before insertion of a lollipop stick into the closed mould cavity, retract one moulding die over a small distance in respect of the other moulding die so as to decrease the pressing force of the two moulding dies on the lump.

3. The apparatus of claim 1 wherein the supply is a funnel which feeds while the moulding drum is rotated, lollipop sticks one after the other to radial channels at the periphery of the rotatable moulding drum, each channel being positioned opposite to a cavity of the moulding drum to move the lollipop sticks to a radially operating insert mechanism which inserts one end of each lollipop stick into a passage and into the closed mould cavities, and in which a plate prevents the lollipop sticks from falling out of channels during movement, and in which the insert mechanism is provided with a stationary guiding cam disposed to exert a pressure force on each lollipop stick by means of a pin comprising a spring biased projecting pressure piece which ejects a lollipop stick out of a radial channel, through a passage in the edge of the guide of the one moulding due, and into the closed mould cavity, said pin being guided in a bore of a plate comprising radial channels and means guiding the pressure piece when it is radially moved.

* * * * *